United States Patent [19]

Blytas

[11] Patent Number: 4,485,082
[45] Date of Patent: Nov. 27, 1984

[54] REMOVAL OF OXALATE ION FROM GAS TREATING SOLUTIONS

[75] Inventor: George C. Blytas, Houston, Tex.

[73] Assignee: Shell Oil Company, Houston, Tex.

[21] Appl. No.: 545,305

[22] Filed: Oct. 25, 1983

[51] Int. Cl.³ .................. C01B 17/05; B01D 53/34
[52] U.S. Cl. ............................ 423/573 R; 423/226
[58] Field of Search ............. 423/224, 226, 573 R, 423/573 G

[56] References Cited

U.S. PATENT DOCUMENTS

| | | | |
|---|---|---|---|
| 3,068,065 | 12/1962 | Hartley et al. | 423/228 |
| 3,226,320 | 12/1965 | Meuly et al. | 423/224 X |
| 3,933,993 | 1/1976 | Salemme | 423/226 X |
| 4,009,251 | 2/1977 | Meuly | 423/226 X |
| 4,091,073 | 5/1978 | Winkler | 423/226 |
| 4,431,616 | 2/1984 | Chou | 423/226 |

Primary Examiner—Earl C. Thomas
Attorney, Agent, or Firm—Albert J. Adamcik

[57] ABSTRACT

A process for removal of $H_2S$ from gaseous streams is described, the process being characterized by division of the gaseous stream into major and minor portions, oxidation of the $H_2S$ in the major portion with an oxidizing reactant solution comprising a polyvalent metal chelate or chelates of nitrilotriacetic acid, and utilization of the minor portion as a source of hydrogen ions to assist precipitation of ferrous oxalate from a bleed stream of the oxidizing reactant solution.

6 Claims, 2 Drawing Figures

REMOVAL OF OXALATE ION FROM GAS TREATING SOLUTIONS

BACKGROUND OF THE INVENTION

The presence of significant quantities of $H_2S$ and $CO_2$ in various "sour" industrial gaseous streams poses a persistent problem. Although various procedures have been developed to remove and recover these contaminants, most such processes are deficient, for a variety of reasons.

In one cyclic method currently attracting attention, the sour gas is contacted, preferably with a solvent-reactant system which comprises a regenerable reactant, to produce solid free sulfur which is recovered either prior or subsequent to regeneration. Suitable reactant materials include polyvalent metallic ions, such as iron, vanadium, copper, manganese, and nickel, and include polyvalent metal chelates. Preferred reactants are coordination complexes in which the polyvalent metals form chelates with specified organic acids.

In yet another process, e.g., that disclosed in U.S. Pat. No. 4,091,073, issued May 23, 1978, to Winkler, $CO_2$ present in the gaseous stream is also removed by the use of a suitable selective absorbent.

Other processes, such as that described in U.S. Pat. No. 3,226,320 to Meuly, involve removal of impurities from aqueous streams utilizing various polyvalent metal chelates.

Because these "cleanup" processes generally represent significant costs to manufacturing operations, any improvements in such processes which increase their efficiency may have great economic important. For example, where ligands or chelates or polyvalent metals are employed, degradation or decomposition of the polyvalent metals represents an important cost in the process, as well as requiring measures for decomposition product bleed, removal or treatment, and addition of fresh solution. Even in the case of preferred chelates such as those of N-(2-hydroxyethyl) ethylene diamine triacetic acid and nitrilotriacetic acid, ligand decomposition, over a period of time, requires attention to prevent build-up of decomposition products and consequent loss of efficiency. As will be recognized, the bleed from such processes contains, along with the decomposition products, a considerable amount of the valuable chelate or chelates. Application Ser. No. 441,830 filed Nov. 15, 1982, and application Ser. No. 452,342, filed Dec. 22, 1982, describe processes for recovery of nitrilotriacetic acid from aqueous solutions. However, the volumes of solution to be handled in the processes mentioned may be quite large. A process that reduced the volumes of solution treated would be a decided advantage.

As noted in the aforementioned disclosures, oxalate ion is present in the solutions employed, apparently as a decomposition product of the ligands employed. While the presence of limited quantities of oxalate ion appears beneficial (see, e.g., U.S. Pat. No. 4,009,251), in practice, the concentration of oxalate ion is significant in determination of bleed rate of the solution. Accordingly, selective removal of oxalate ion from the liquid solution would tend to minimize bleed rate and improve the economics of such processes.

In my copending application Ser. No. 545,306, entitled Oxalate Ion Removal, filed even date herewith, which disclosure is incorporated herein by reference, there is disclosed a process for removal of oxalate ion from a variety of solutions. A key feature of the invention disclosed therein is the lowering of the pH of the oxalate ion containing solution by the addition of an amount of various pH lowering substances sufficient to precipitate ferrous oxalate, but not remove the nitrilotriacetic acid chelate or chelates in the solution. The present invention relates to a unique manner of providing a portion of the hydrogen ion required to increase ferrous concentration and lower pH, thereby reducing the expense of operation.

SUMMARY OF THE INVENTION

Accordingly, the invention relates to a process in which an aqueous solution or admixture employed in treating a sour gaseous stream and which contains a composition selected from polyvalent metal chelates of nitrilotriacetic acid, and mixtures thereof, and decomposition products of said composition, including oxalate ion, is contacted with a minor portion of the sour gaseous stream in a zone separate from the main treating zone, the $H_2S$ in the sour gaseous stream providing hydrogen ion and sulfur in said solution. Under conditions to precipitate ferrous oxalate, but not remove the bulk of the polyvalent metal chelate or chelates in the solution or admixture, additional composition sufficient to lower the pH to a point where ferrous oxalate will precipitate is added. The ferrous oxalate is precipitated, and the precipitated solid is separated from the solution or admixture. As used herein, the term "under conditions to precipitate" and variants thereof, merely implies the use of temperatures at which the ferrous oxalate exceeds its solubility in the solution or admixture treated. Such conditions may be inherent in the steps performed, or may be accomplished simply by cooling. It is not necessary that all the oxalate be precipitated; some oxalate, as noted, supra, is beneficial. Moreover, undue lowering of pH will precipitate nitrilotriacetic acid, as described in the abovementioned applications.

As indicated, the stream or aqueous admixture treated is preferably a bleed stream from one of the processes mentioned, supra. In particular, the invention is admirably suited to remove oxalate ion in a bleed stream from a cyclic process for $H_2S$ removal from gas streams, even those of such processes utilizing a selective absorbent, wherein the oxidizing reactant is a polyvalent metal chelate or chelates of nitrilotriacetic acid. In such cases, the solution or admixture having reduced oxalate ion content may simply be returned to a suitable point in the process. Because such a stream will be small in relation to the volume of solution in the system, minimal pH adjustment will be required, and may be conducted as part of the overall pH adjustment of the system. Separate pH adjustment may be made by addition of any suitable basic materials, as will be recognized by those skilled in the art. The oxidizing polyvalent metal chelates of nitrilotriacetic acid, and mixtures thereof, will be used in the $H_2S$ removal embodiment of the invention. The chelates or iron, copper, vanadium and manganese are preferred, particularly iron.

Accordingly, in this context, the invention comprises, in one embodiment, a process for the removal of $H_2S$ from a sour gaseous stream including:

(a) dividing the sour gaseous stream into a major portion and a minor portion comprising from about 0.1 percent by volume to about 30 percent by volume of the total sour gaseous stream;

(b) contacting the major portion in a first contacting zone with an aqueous reaction solution at a temperature below the melting point of sulfur, the mixture comprising an effective amount of an oxidizing reactant selected from the group consisting of oxidizing polyvalent metal chelates of nitrilotriacetic acid, and mixtures thereof, to produce a sweet gas stream and an aqueous admixture containing sulfur and reduced reactant;

(c) removing aqueous admixture from the contacting zone, and removing solid sulfur from said aqueous admixture;

(d) regenerating said aqueous admixture, producing a regenerated oxidizing reactant solution, and returning regenerated oxidizing reactant solution to the contacting zone;

(e) removing a bleed stream containing a composition selected from polyvalent metal chelates of nitrilotriacetic acid, and mixtures thereof, and containing decomposition products of said composition including oxalate ion, from one or more loci in or between steps b, c or d;

(f) contacting said bleed stream with said minor portion in a second contacting zone to reduce the $H_2S$ concentration in said gaseous stream, and producing hydrogen ions and sulfur in said bleed stream, concomitantly or subsequently adding a composition capable of providing hydrogen ions in said bleed stream under conditions and in an amount sufficient to precipitate ferrous oxalate, but not remove the bulk of the polyvalent chelate or chelates in the bleed stream, and precipitating said ferrous oxalate and separating precipitated solid from the bleed stream.

As will be evident to those skilled in the art, the particular location or point of removal of the bleed in such a process is not critical, although removal of the bleed "subsequent" to the contact zone and "prior" to return of regenerated solution to the contact zone in the cyclic process is preferred. Again, the bleed may be removed from a portion of the process stream if the stream is divided for any purpose, e.g., a portion for sulfur removal, and a portion sent directly to regeneration. The specifics of the $H_2S$ removal process are not critical; e.g., the sulfur and bleed may be removed prior to or subsequent to regeneration. Moreover, the sulfur may first be concentrated in a portion of the liquid in circulation in the process, and this may be done prior to or subsequent to regeneration. If the sulfur-containing liquid is first concentrated into a slurry before final separation of the sulfur, the liquid, or a portion thereof, from the slurry may be utilized as a "bleed" stream. The bleed stream may be continuous or intermittent, although the overall $H_2S$ removal procedure is preferably continuous. Fresh make-up chelate or chelate-containing solution may similarly be supplied continuously or intermittently. The rate and volume of bleed will depend on a variety of factors, but, as indicated, the concentration of oxalate ion is the predominant consideration. Accordingly, a precise volume of bleed (and make-up) (although obviously a quite minor portion of the total volume of liquid in the system) cannot be given, but, in general, 20 percent to 0.5 percent, by volume, of the total liquid capacity in the process will suffice. The bleed may be returned to any suitable point in the system.

As indicated, the invention also encompasses treating sour gaseous streams which contain $H_2S$ and significant quantities of $CO_2$, in the manner described. More particularly, the sour gas stream containing $H_2S$ and $CO_2$ is contacted with a selective absorbent-aqueous reactant mixture at a temperature below the melting point of sulfur, the reactant mixture and procedure being similar to that described, supra. Broadly, this is accomplished by the use of an absorbent mixture containing a selective absorbent for $CO_2$ (and preferably for $H_2S$, as well), and an effective amount of an oxidizing polyvalent metal chelate of nitrilotriacetic acid, and mixtures thereof, as described supra. A purified or "sweet" gaseous stream is produced which meets general industrial and commercial $H_2S$ and $CO_2$ specifications. The $CO_2$ is absorbed and the $H_2S$ is immediately converted to sulfur by the polyvalent metal chelate, etc. In the process, the reactant is reduced, and the sulfur may be treated, as described supra. The sulfur may be removed prior or subsequent to regeneration of the admixture. A bleed stream may suitably be removed, and treated, as described herein.

DETAILED DESCRIPTION OF THE INVENTION

Figure 1:
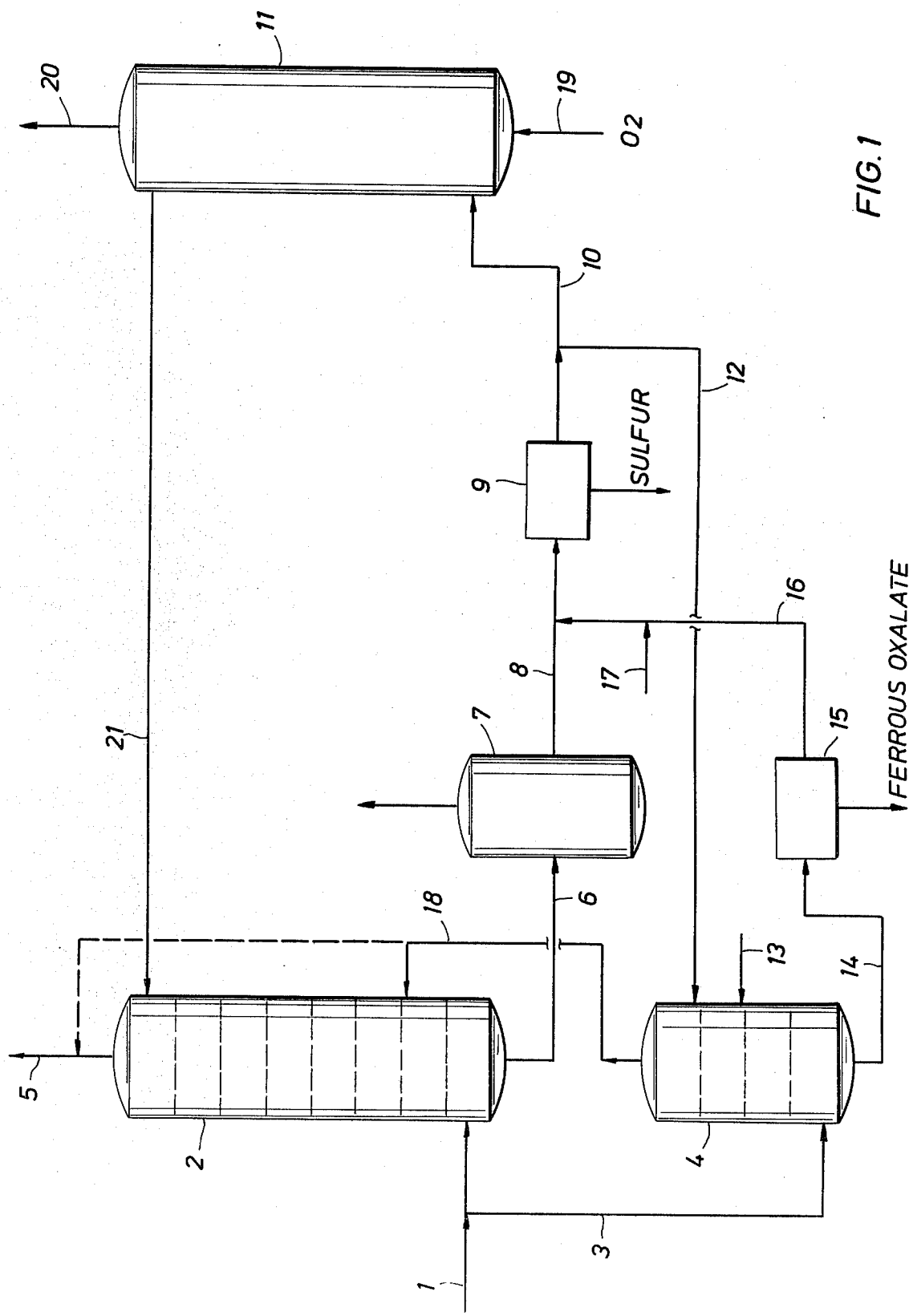

The portion of the sour gaseous stream employed in lowering the pH of the oxalate ion containing stream will range from about 0.01 percent to about 30 percent by volume, depending on the concentration of $H_2S$ in the gaseous stream. The portion is added preferably on a continuous basis, in sufficient amount to lower the pH of the solution to about pH 5. As in my previous application, a pH lowering substance is then added in sufficient amount to lower the pH of the solution and precipitate ferrous oxalate. Any composition capable of providing sufficient hydrogen ions in solution to lower the pH the desired amount may be employed. Suitable compositions include, but are not limited to, $H_2SO_4$, HCl, $H_3PO_4$, $SO_2$, $NaHSO_4$, $H_3N(CH_2COOH)$, N-(-2-hydroxyethyl)ethylene diamine triacetic acid, ethylene diamine tetraacetic acid, various phosphonic acids, and mixtures thereof. The compositions are supplied in an amount sufficient to precipitate the bulk of the oxalate without removing a substantial quantity of the polyvalent metal complex or complexes of nitrilotriacetic acid in the solution or admixture. In general, at the temperatures contemplated, sufficient acid should be supplied to lower the pH of the solution or admixture to a pH of about 3 to 5. This amount, of course, may be determined routinely. The precipitated ferrous oxalate may be separated by any suitable means such as by filtration, and the supernatant liquid is recovered and returned to the gas treating process. Suitable temperatures will range from 10° to 80° C., preferably from 20° to 45° C. Prior to return of the solution to the process, the solution, now having reduced oxalate content, may be treated or contacted with a suitable basic composition. Or, as noted supra, the stream may simply be returned to the system, the overall pH adjustment of the system being employed to arrive at the proper pH. As used herein, the term "basic composition" refers to compositions capable of raising the pH of the polyvalent metal nitrilotriacetic acid complex solution, from which oxalate has been removed, to a pH of from 7 to 9. Suitable basic compositions include but are not limited to $NH_4OH$, NaOH, $Na_2CO_3$, $Na_3N(CH_2COOH)_3$, the Na salt of N-(2-hydroxyethyl)ethylene diamine triacetic acid, or the Na salt of ethylene diamine tetraacetic acid. As will be recognized by those skilled in the art, not only must pH be raised, but the polyvalent metal precipitated must be replaced. This may be done in any suitable fashion. In the case of iron, for example, the iron may be added or replaced as iron carbonate. Alternately, iron/ammonia mixtures may be used.

The particular types of solutions or admixtures treated according to the invention do not appear critical. Since the complex values sought to be maintained appear stable at the pH levels involved, virtually any gas treating solution containing the specified polyvalent metal chelate or chelates of nitrilotriacetic acid and their decomposition products and oxalate ion and from which it is sought to remove the oxalate may be employed. The polyvalent metal chelate or chelates may be present in more than one species; for example, the solution or admixture might and preferably would contain both the $Fe^{+++}$ and $Fe^{++}$ chelates of nitrilotriacetic acid. As indicated, it is an advantage of the invention that the bulk of the chelate does not precipitate, but remains in solution upon the acid addition, and thus, an effective separation is achieved.

While the invention, accordingly, has general utility, nonetheless, the great value of the invention lies in the ability to retain the polyvalent metal nitrilotriacetic acid complex so that it may be returned to the aforementioned gas purification processes. The polyvalent metal chelates of nitrilotriacetic acid are readily formed in aqueous solution by reaction of an appropriate salt, oxide, or hydroxide of the polyvalent metal and the chelating agent in the acid form or an alkali or ammonium salt of the chelating acid.

In the case of utilization of a bleed stream from the aforementioned gas purification processes, the particular type of gaseous stream treated and apportioned is not critical, as will be evident to those skilled in the art. Streams particularly suited to removal of $H_2S$ by the practice of the invention are, as indicated, naturally-occurring gases, synthesis gases, process gases, or effluents, and fuel gases produced by gasification procedures, e.g., gases produced by the gasification of coal, petroleum, shale, tar, sands, etc. Particularly preferred are coal gasification streams, natural gas streams and refinery feedstocks composed of gaseous hydrocarbon streams, especially those streams of this type having a low ratio of $H_2S$ to $CO_2$, and other gaseous hydrocarbon streams. The term "hydrocarbon stream(s)", and other gaseous hydrocarbon streams. The term "hydrocarbon stream(s)", as employed herein, is intended to include streams containing significant quantities of hydrocarbon (both paraffinic and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the practice of the invention. The $H_2S$ content of the type of streams contemplated will vary extensively, but, in general, will range from about 0.1 percent to about 10 percent by volume. $CO_2$ content may also vary, but may range from about 0.5 percent to about 95 percent or greater by volume. Obviously, the amount of $H_2S$ and $CO_2$ present are not generally a limiting factor in the practice of the invention.

The temperatures employed in the contacting or absorptioncontact zone are not generally critical, except that the reaction is carried out below the melting point of sulfur, and, if an absorbent is used, the temperatures employed must permit acceptable absorption of $CO_2$. In many commercial applications, such as the removal of $H_2S$ and $CO_2$ from natural gas to meet pipeline specifications, absorption at ambient temperatures is desired, since the cost of refrigeration would exceed the benefits obtained due to increased absorption at the lower temperature. In general, temperatures from 10° C. to 80° C. are suitable, and temperatures from 20° C. to 45° C. are preferred. Contact times will range from about 1 second to about 120 seconds, with contact times of 2 seconds to 60 seconds being preferred.

Similarly, in the regeneration or stripping zone or zones, temperatures may be varied widely. Preferably, the regeneration zone should be maintained at substantially the same temperature as the contacting zone. If heat is added to assist regeneration, cooling of the aqueous admixture is required before return of the admixture to the contacting zone. If heat is added to assist regeneration, cooling of the aqueous admixture is required before return of the admixture to the contacting zone. In general, temperatures of from about 10° C. to 80° C., preferably 20° C. to 40° C., may be employed.

Pressure conditions in the contacting or absorption zone may vary widely, depending on the pressure of the gas to be treated. For example, pressures in the contact zone may vary from one atmosphere up to one hundred fifty or even two hundred atmospheres are preferred. In the regeneration or desorption zone or zones, pressures may also be varied considerably, and will preferably range from about 0.5 atmosphere to about three or four atmospheres. The pressure-temperature relationships involved are well understood by those skilled in the art, and need not be detailed herein. Other conditions of operation for this type of reaction process, e.g., pH, etc., are further described in U.S. Pat. No. 3,068,065 to Hartley, et al, dated Dec. 11, 1962, and U.S. Pat. No. 4,009,251, to Meuly, issued Feb. 22, 1977, which disclosures are incorporated herein by reference. Preferably, if the iron chelate of nitrilotriacetic acid is used, pH in the process of the invention will range from about 6 to about 7.5, and the molar ratio of the nitrilotriacetic acid to the iron is from about 1.2 to 1.6. The procedure is preferably conducted continuously.

As indicated, the invention provides for the regeneration of the reactant and the absorbent. Preferably, the loaded absorbent mixture and the reduced polyvalent metal chelate, or mixtures thereof, are regenerated by contacting the mixture in a regeneration zone or zones with oxygen. As used herein, the term "oxygen" includes oxygen-containing gases such as air, or air-enriched with oxygen. If significant quantities of $CO_2$ have been absorbed, the reactant-containing solution is preferably treated, such as by heating or pressure reduction, to remove the bulk of the $CO_2$ before regeneration of the reactant (either prior or subsequent to sulfur removal). Alternately, or if small quantities of $CO_2$ are absorbed, the $CO_2$ may simply be stripped in the regeneration zone.

As noted, the regeneration of the reactant is preferably accomplished by the utilization of oxygen, preferably as air. The oxygen will accomplish two functions, the oxidation of the reactant to its higher valence state, and the stripping of any residual $CO_2$ (if originally present) from the absorbent mixture. The oxygen (in whatever form supplied) is supplied in a stoichiometric equivalent or excess with respect to the amount of reduced metal ion of the chelate or chelates present in the mixture. Preferably, the oxygen is supplied in an amount from about 1.2 to 3 times excess.

The $H_2S$ in the major portion is, when contacted, quickly converted in the first contact or contacting zone by the polyvalent metal chelate, or chelates of the nitrilotriacetic acid to elemental sulfur. The amount of the polyvalent metal chelate, or mixtures thereof, supplied is an effective amount, i.e., an amount sufficient to convert all or substantially all of the $H_2S$ in the major portion of the gas stream, and will generally be on the order of at least about one mol per mol of $H_2S$. Ratios of from about 1 to 2 mol to about 15 mols of polyvalent metal chelate per mol of $H_2S$ may be used, with ratios of from about 2 mols per mol to about 5 mols of polyvalent metal chelate per mol of $H_2S$ being preferred. The manner of preparing the aqueous solution or admixture is a matter of choice. The polyvalent metal chelate solution will generally be supplied as an aqueous solution having a concentration of from about 0.1 molar to about 2 molar, and a concentration of about 0.5 molar is preferred.

The rapidity of conversion of the bulk of the $H_2S$ in the minor portion of the bleed stream is dependent, to some extent, on the source of the bleed stream with which it is contacted. If, e.g., the bleed stream is removed from flow of freshly regenerated solution or admixture, total conversion will require minimal contact times. If, on the other hand, the bleed is from "spent" solution or admixture coming from the primary contacting zone, total conversion will be slower since the concentration of oxidized reactant will be lower. Those skilled in the art may adjust the contact times to promote efficient operation.

In the same vein, if all the $H_2S$ in the minor portion is not removed, e.g., if the concentration of the oxidizing reactant is insufficient to convert all of the $H_2S$ in the minor portion, the partially sweetened gas may be returned either to the primary flow of the gaseous stream or directly to the primary contacting zone. If all $H_2S$ is removed, the purified gas may be used or recovered, or sent to join the sweetened major portion. Sulfur produced may be removed prior to oxalate precipitation, or removed with the oxalate.

Since the polyvalent metal chelates or nitrilotriacetic acid have limited solubility in many solvents or absorbents, if an absorbent is used, the polyvalent metal chelates are preferably supplied in admixture with the liquid absorbent and water. The manner of preparing the admixture containing an absorbent is a matter of choice. For example, the chelate may be added to the absorbent, and, if necessary, then water added. The amount of water added will normally be just that amount necessary to achieve solution of the polyvalent metal chelate, and can be determined by routine experimentation. Since the polyvalent metal chelate or chelates may have a significant solubility in the solvent, and since water is produced by the reaction of the $H_2S$ and the ions of the chelate or chelates, precise amounts of water to be added cannot be given. In the case of absorbents having a low solubility for the polyvalent metal chelate or chelates, approximately 5 percent to 10 percent water by volume, based on total volume of the absorbent mixture, will generally provide solvency. Preferably, however, the polyvalent metal chelate or chelates are added as an aqueous solution to the liquid absorbent. Where the reactant is supplied as an aqueous solution, the amount of solution supplied may be about 20 percent to about 80 percent by volume of the total absorbent admixture supplied to the absorption zone. A polyvalent metal chelate solution will generally be supplied as an aqueous solution having a concentration of from about 0.1 molar to about 2 molar, and a concentration of about 0.5 molar is preferred.

If an absorbent is employed, it is selected from those absorbents which have a high degree of selectivity in absorbing $CO_2$ (and preferably $H_2S$ as well) from the gaseous streams. Any of the known absorbents conventionally used (or mixtures thereof) which do not affect the activity of the polyvalent chelate, or mixtures thereof, and which exhibit sufficient solubility for the reactant or reactants may be employed. As indicated, the absorbent preferably has good absorbency for $H_2S$ as well, in order to assist in the removal of any $H_2S$ present in the gaseous streams. The particular absorbent chosen is a matter of choice, given these qualification, and selection can be made by routine experimentation. For example, diethylene glycol ethyl mono-ether, propylene carbonate, tetraethylene glycol-dimethyl ether, N-methyl pyrrolidone, sulfolane, methyl isobutyl ketone, 2,4-pentanedione, 2,5-hexanedione, diacetone alcohol, hexyl acetate, cyclohexanone, mesityl oxide, and 4-methyl-4-methoxy-pentone-2 may be used. Suitable temperature and pressure relationships for different $CO_2$— selective absorbents are known, or can be calculated by those skilled in the art.

The bleed stream is preferably treated after sulfur removal, most preferably before regeneration. The advantage of pre-regeneration treatment is the higher concentration of ferrous ion. The manner of recovery of the sulfur is a matter of choice. For example, the sulfur may be recovered by settling, filtration, or by suitable devices such as a hydroclone. Moreover, it may be advantageous to concentrate the sulfur first in a portion of the admixture, either before or after regeneration. For example, the sulfur-containing admixture from the contacting zone (or from the regeneration zone) may be separated into two portions, a portion or stream having reduced sulfur content, and a portion or stream containing increased sulfur content, preferably a slurry. The separation may be accomplished by a hydroclone or a centrifugal separator. If a slurry is produced, the "slurry" or concentrated stream will comprise 2 percent to 30 percent, by volume, (on a continuous basis) of the total stream from the contact or regeneration zone. It is not necessary that absolutely all sulfur be removed on a continuous basis in the process; the process may suitably be operated with a very minor inventory or significantly reduced content of sulfur in the system.

In the case where a slurry is produced, the slurry may be filtered or subjected to further treatment to remove the sulfur, and the recovered admixture may be used as all or portion of the bleed treated for oxalate removal, or it may be returned to the process cycle, either before or after regeneration.

In order to describe the invention in greater detail, reference is made to the accompanying schematic drawing. The values given herein relating to temperatures, pressures, compositions, etc., are calculated or merely exemplary and should not be taken as delimiting the invention.

Figure 2:
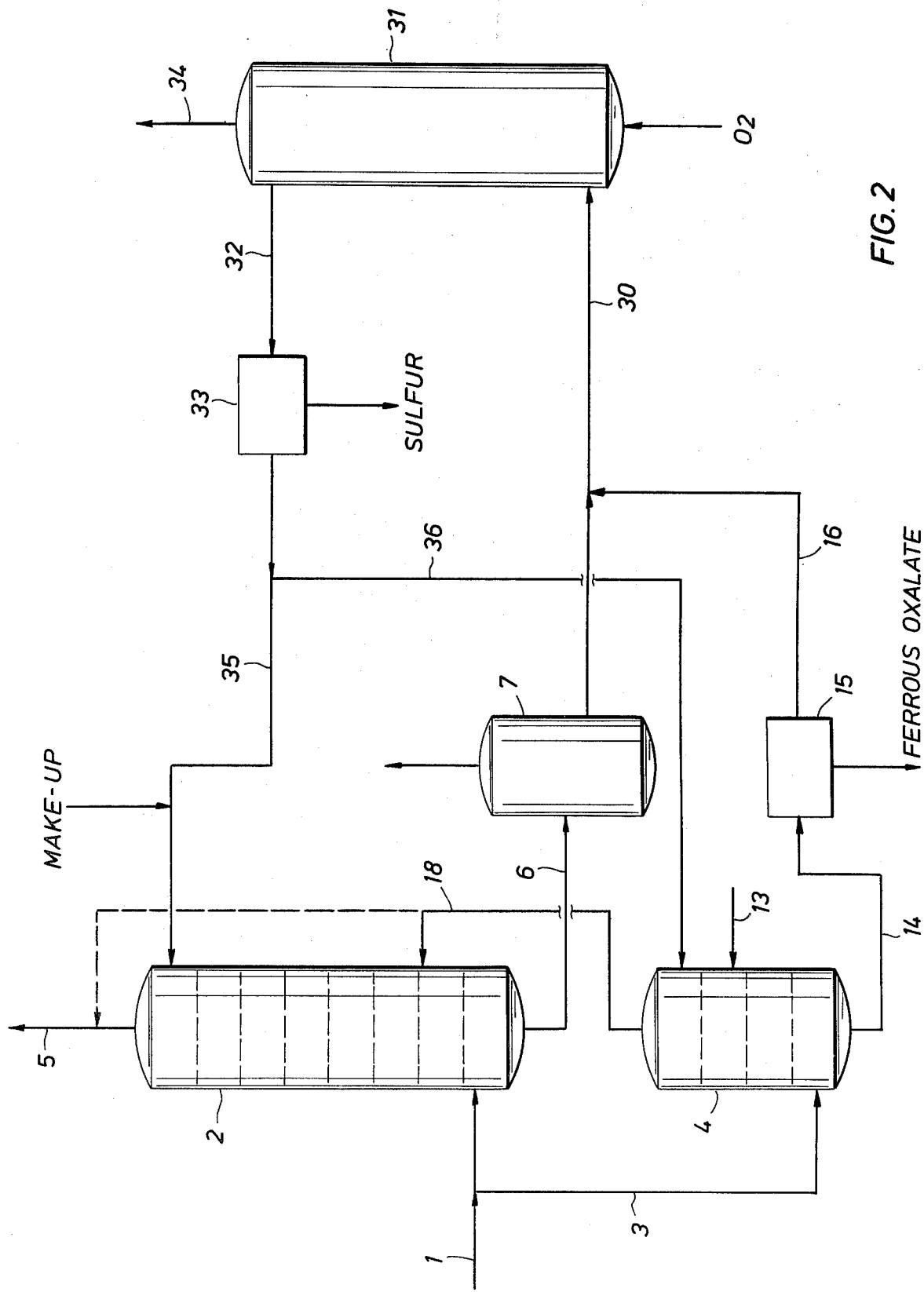

FIG. 1 illustrates the embodiment of the invention wherein sulfur is removed prior to regeneration, while FIG. 2 illustrates the removal of the sulfur after regeneration.

In FIG. 1, sour gas, e.g., natural gas containing about 0.5 percent by volume $H_2S$, in line (1) enters contactor or column (2) (tray type) into which also enters, from line (21), an aqueous admixture comprising an aqueous 2.0M solution of the Fe(III) chelate of nitrilotriacetic acid having a pH of 7. Prior to the entry of the gas in contactor (2), a minor portion, 6 percent by weight, based on the total weight of the sour gas stream, is separated via line (3) and passed to secondary contactor (4), which will be discussed more fully hereinafter. The pressure of the feed gas in line (1) is about 1200 p.s.i.g., and the temperature of the aqueous admixture is about 35° C. A contact time of about 120 seconds is employed in unit (2) in order to react all the H$_2$S in the sour gaseous stream. Purified or "sweet" gas leaves column (2) through line (5). The "sweet" gas is of a purity sufficient to meet standard requirements.

In the admixture of unit (2), the H$_2$S is converted to elemental sulfur by the Fe(III) chelate, the Fe(III) chelate in the process being converted to the Fe(II) chelate. A minor portion of the chelate compound also degrades, giving rise to a minor concentration of oxalate ion in the admixture. The aqueous admixture containing elemental sulfur is removed continuously and sent through line (6) to a depressurization and degassing unit (7), and then through line (8) to sulfur recover unit (9). Sulfur recovery unit (9) may be of any suitable type. Preferably, unit (9) comprises a filtration unit. It is not necessary that all the sulfur be removed in the sulfur recovery step, and some sulfur retention may be beneficial. The type of unit chosen is thus flexible. Preferably, the amount of sulfur removed in the separation step is simply balanced with the rate of sulfur intake in line (8), which is of course, dependent on the amount of H$_2$S in gas stream (1). Those skilled in the art may adjust the appropriate rates of withdrawal of the streams. From unit (9), the sulfur-free or substantially sulfur-free solution is sent via line (10) to regeneration zone (11). Prior to the entry of the sulfur-free or substantially sulfur-free solution in regeneration zone (11), a "bleed" stream, representing perhaps 10 percent by weight of the stream in line (10) is separated and forwarded via line (12) to contactor (4). In contactor (4) the bleed solution or admixture is contacted with the minor portion of the sour gaseous stream in line 3, thereby utilizing the H$_2$S to reduce the pH of the solution. Enough H$_2$S is provided to reduce most of the ferric to ferrous, and to supply, on an active basis, sufficient hydrogen to lower the pH to a pH of about 5. Vent gas from (4), if containing H$_2$S, is sent via line (18) to unit (2), or, if H$_2$S-free, preferably to line (5). Concomitantly, a mixture of nitrilotriacetic acid and NaHSO$_3$ is added via line (13) to lower the pH to about 3. Temperature in contact (4) is about 45° C. Ferrous oxalate precipitates, and a solution containing ferrous oxalate is removed via line (14) and sent to filter (or any other suitable separation device) (15) where the ferrous oxalate is removed. Those skilled in the art will recognize that some sulfur and other solution components will also be removed as solids. The admixture, now containing reduced oxalate ion content, is removed via line (16), and returned via line (8) to the system. If desired, pH adjustment and iron concentration adjustment, e.g., addition of FeCO$_3$, may be made via line (17).

In regeneration zone or column (11), the admixture is contacted with excess air from line (19) to convert Fe(II) chelate in the admixture to the Fe(III) chelate. The temperature of the regeneration column is about 35° C., and pressure in the column is maintained at about 2 atmospheres. Spent air is removed from column (11) through line (20), while regenerated aqueous admixture is returned via line (21) to contactor (2).

As indicated, FIG. 1 illustrates the aspect of the invention wherein the sulfur recovery is carried out prior to regeneration. Removal of the sulfur after regeneration may be preferred in some instances, and may be accomplished by positioning of the sulfur recovery unit "after" the regeneration zone. Thus, in a separate embodiment, regenerated liquid, still containing sulfur, may be passed to units analogous or equivalent to unit (9), sulfur recovered, and regenerated sulfur-free solution returned to contactor (2).

Accordingly, in FIG. 2, apparatus elements 1 through 7 and 13 through 15 correspond to those elements illustrated in FIG. 1. The sulfur-containing liquid is passed, after degassing in (7), via line (30) to regenerator (31) where it is regenerated, as previously described. The regenerated sulfur containing admixture is removed via line (32), and passed to sulfur recovery unit (33). Spent air is removed via line (34). Regenerated reactant solution is returned via line (35) to contactor (2).

As further illustrated in FIG. 2, bleed stream (36) is removed from line (35), and is sent to contactor (4). Operation of contactor (4) and units (13) through (15) is similar to that described previously, except that larger amounts of H$_2$S will be required to reduce the higher concentrations of ferric ion present. Supernatant liquid is returned via line (16) to regeneration.

While the invention has been illustrated with particular apparatus, those skilled in the art will appreciate that, except where specified, other equivalent or analogous units may be employed. The term "zones", as employed in the specification and claims, includes, where suitable, the use of segmented equipment operated in series, or the division of one unit into multiple units because of size constraints, etc. For example, a contacting column might comprise two separate columns in which the solution from the lower portion of the first column would be introduced into the upper portion of the second column, the gaseous material from the upper portion of the first column being fed into the lower portion of the second column. Parallel operation of units, is of course, well within the scope of the invention.

Again, as will be understood by those skilled in the art, the solutions or mixtures employed may contain other materials or additives for given purposes. For example, U.S. Pat. No. 3,933,993 discloses the use of buffering agents, such as phosphate and carbonate buffers.

What is claimed is:

1. A process for the removal of H$_2$S from a sour gaseous stream comprising
   (a) dividing the sour gaseous stream into a major portion and a minor portion comprising from about 0.01 percent by volume to about 30 percent by volume of the total sour gaseous stream;
   (b) contacting the major portion in a first contacting zone with an aqueous reaction solution at a temperature below the melting point of sulfur, the mixture comprising an effective amount of oxidizing reactant selected from the group consisting of oxidizing polyvalent metal chelates of nitrilotriacetic acid, and mixtures thereof, to produce a sweet gas stream and an aqueous admixture containing sulfur and reduced reactant;
   (c) removing aqueous admixture from the contacting zone, and removing solid sulfur from said aqueous admixture;

(d) regenerating said aqueous admixture, producing a regenerated oxidizing reactant solution, and returning regenerated oxidizing reactant solution to the contacting zone;

(e) removing a bleed stream containing a composition selected from polyvalent metal chelates of nitrilotriacetic acid, and mixtures thereof, and containing decomposition products of said composition including oxalate ion, from one or more loci in or between steps b, c or d;

(f) contacting said bleed stream with said minor portion in a second contacting zone to reduce the $H_2S$ concentration in said gaseous stream, and producing hydrogen ions and sulfur in said bleed stream, concomitantly or subsequently adding a composition capable of providing hydrogen ions in said solution under conditions and in an amount sufficient to precipitate ferrous oxalate, but not remove the bulk of the polyvalent metal chelate or chelates in the bleed stream, and precipitating ferrous oxalate and separating precipitated solid from the bleed stream.

2. The process of claim 1 wherein the sour gaseous stream is selected from natural gas, a stream derived from the gasification of coal, or a process effluent.

3. The process of claim 1 wherein the aqueous reaction solution comprises a liquid absorbent selective for $CO_2$.

4. A process for the removal of $H_2S$ from a sour gaesous stream comprising (a) dividing the sour gaseous stream into a major portion and a minor portion comprising from about 0.01 percent by volume to about 30 percent by volume of the total sour gaseous stream;

(b) contacting the major portion in a first contacting zone with an aqueous reaction solution at a temperature below the melting point of sulfur, the mixture comprising an effective amount of oxidizing reactant selected from the group consisting of oxidizing polyvalent metal chelates of nitrilotriacetic acid, and mixtures thereof, to produce a sweet gas stream and an aqueous admixture containing sulfur and reduced reactant;

(c) removing aqueous admixture from the contacting zone, and regenerating said aqueous admixture, producing a regenerated oxidizing reactant solution containing sulfur;

(d) removing sulfur from the regenerated oxidizing reactant solution; and returning regenerated oxidizing reactant solution to the contacting zone;

(e) removing a bleed stream containing a composition selected from polyvalent metal chelates of nitrilotriacetic acid, and mixtures thereof, and containing decomposition products of said composition including oxalate ion, from one or more loci in or between steps b, c or d;

(f) contacting said bleed stream with said minor portion in a second contacting zone to reduce the $H_2S$ concentration in said gaseous stream, and producing hydrogen ions and sulfur in said bleed stream, concomitantly or subsequently adding a composition capable of providing hydrogen ions in said solution under conditions and in an amount sufficient to precipitate ferrous oxalate, but not remove the bulk of the polyvalent metal chelate or chelates in the bleed stream, and precipitating ferrous oxalate and separating precipitated solid from the bleed stream.

5. The process of claim 4 wherein the sour gaseous stream is selected from natural gas, a stream derived from the gasification of coal, or a process effluent.

6. The process of claim 4 wherein the aqueous reaction solution comprises a liquid absorbent selective for $CO_2$.

* * * * *